(12) United States Patent
Balducci et al.

(10) Patent No.: US 8,794,085 B2
(45) Date of Patent: Aug. 5, 2014

(54) ELECTROMECHANICAL TELESCOPIC ACTUATOR

(75) Inventors: Gerard Balducci, Saint-Germain-de-la-Grange (FR); Marc Quenerch'Du, Paris (FR)

(73) Assignee: Messier-Bugatti-Dowty, Velizy-Villacoublay (FR)

( * ) Notice: Subject to any disclaimer, the term of this patent is extended or adjusted under 35 U.S.C. 154(b) by 289 days.

(21) Appl. No.: 13/312,599

(22) Filed: Dec. 6, 2011

(65) Prior Publication Data

US 2012/0137802 A1 Jun. 7, 2012

(30) Foreign Application Priority Data

Dec. 6, 2010 (FR) .................................... 10 60094

(51) Int. Cl.
*F16H 27/02* (2006.01)
(52) U.S. Cl.
USPC ........ 74/89.35; 74/89.37; 74/89.38; 74/89.42
(58) Field of Classification Search
USPC ............ 74/89.34, 89.35, 89.36, 89.37, 89.38, 74/89.42
See application file for complete search history.

(56) References Cited

U.S. PATENT DOCUMENTS

| 2,701,478 | A | | 2/1955 | Riess | |
|---|---|---|---|---|---|
| 4,920,817 | A | * | 5/1990 | Granbom | 74/424.9 |
| 4,966,045 | A | * | 10/1990 | Harney | 74/424.96 |
| 5,732,597 | A | * | 3/1998 | Devenyi | 74/424.95 |
| 5,857,383 | A | * | 1/1999 | Devenyi | 74/424.94 |
| 6,691,837 | B1 | * | 2/2004 | Kapaan et al. | 188/72.1 |
| 6,857,332 | B2 | * | 2/2005 | Pfister | 74/89.34 |
| 7,347,115 | B2 | * | 3/2008 | Otaki et al. | 74/89.38 |
| 8,201,657 | B2 | * | 6/2012 | Yamakawa et al. | 180/444 |
| 8,424,402 | B2 | * | 4/2013 | Watanabe et al. | 74/89.38 |
| 2010/0162838 | A1 | | 7/2010 | Hirai et al. | |

FOREIGN PATENT DOCUMENTS

| DE | 10 2004 062 320 A1 | 7/2006 |
|---|---|---|
| DE | 10 2007 054 180 A1 | 5/2009 |
| DE | 10 2008 061 120 A1 | 6/2010 |
| JP | 2006-189129 A | 7/2006 |

* cited by examiner

*Primary Examiner* — David M Fenstermacher
(74) *Attorney, Agent, or Firm* — Sughrue Mion, PLLC

(57) ABSTRACT

A telescopic actuator comprising a cylinder having a structure for coupling the cylinder to a first external element a rod mounted to slide telescopically in the cylinder along a sliding axis and including a structure for coupling it to a second external element and a lead screw mounted to rotate in the cylinder about the sliding axis and extending inside the rod to co-operate with a nut secured to the rod, such that rotating the lead screw causes the rod to slide. There also is a drive structure for driving the lead screw in rotation and a retention structure for axially retaining the lead screw. The retention structure holds a bearing of the lead screw captive in an axial direction and is arranged to retain the bearing of the lead screw with axial clearance suitable for absorbing movements imparted to the rod relative to the cylinder.

3 Claims, 1 Drawing Sheet

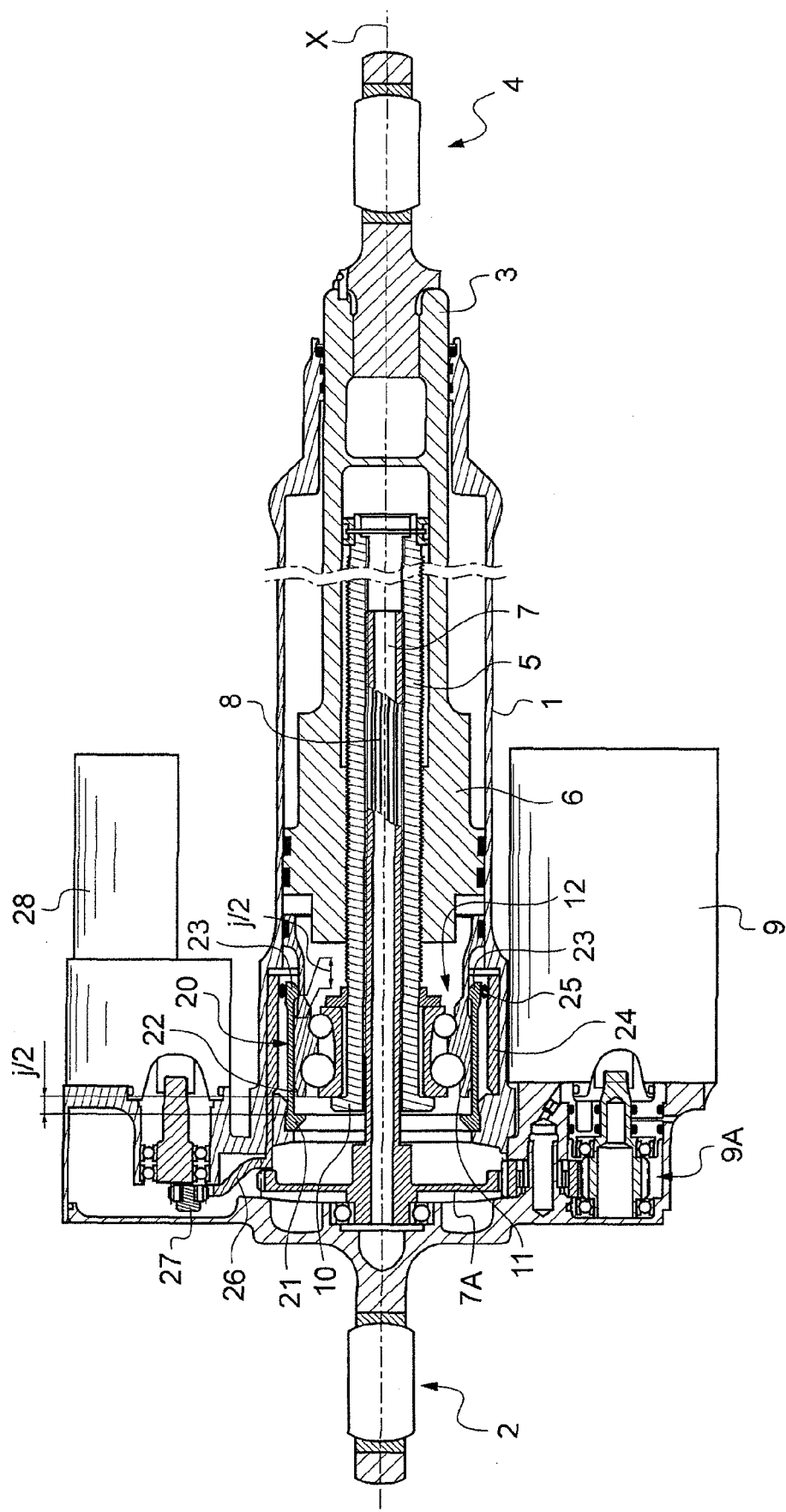

ELECTROMECHANICAL TELESCOPIC ACTUATOR

The invention relates to an electromechanical telescopic actuator, intended in particular for operating an aircraft undercarriage.

TECHNOLOGICAL BACKGROUND OF THE INVENTION

Under certain circumstances, the telescopic actuators used for moving one element relative to another element can be used in parallel with a member that imposes a distance between the two elements that are coupled to the actuator. This applies for example to an aircraft undercarriage having a leg that is hinged to the structure of the aircraft when it reaches a deployed position. It is known to couple a strut between the leg and the structure of the aircraft, the strut being locked in position when the leg reaches the deployed position, thereby stabilizing the leg in said position. The actuator for operating the undercarriage, which is also coupled to the leg of the undercarriage and to the structure of the aircraft, is then in parallel with the strut, which strut is rigid. The length of the actuator, i.e. the distance between its two attachment points, is then imposed by the strut. Furthermore, the leg and the strut may deform in service, thereby imposing variations in length on the actuator.

The hydraulic actuators that have been used in the past for raising undercarriages are well adapted to the raising function since they are reversible, thereby enabling them to follow the movements as imposed by deformation of the undercarriage without difficulty. Providing both chambers of the actuator are connected to the return, the opposing force delivered by the actuator against said variations of length is minimal.

Electromechanical actuators give rise to greater problems. In general, they are not reversible, which means that they cannot lengthen or shorten under the effect of external stress. Furthermore, they are liable to impose an opposing force that is very high. This opposing force stresses both the internal structure of the actuator and the points on the undercarriage or of the aircraft structure where it is attached.

Telescopic electromechanical actuators are also known that include a cylinder in which a rod is mounted to slide. The actuator has a lead screw that is actuated by an electric motor and that extends inside the rod. The rod of the actuator is secured to a nut that cooperates with the screw so that when the screw is rotated by the motor, the rod slides telescopically in the cylinder. The actuator includes retention means that hold a bearing for the screw in an axial direction. In certain actuators, the retention means are capable of releasing the bearing axially so as to allow the rod to move under the action of a load coupled to the rod, e.g. in the event of the motor jamming. That type of actuator is particularly adapted to the function of operating an undercarriage, since in the event of the motor jamming, it is still possible to release the rod, and thus to allow the undercarriage leg to be lowered down to its deployed position, under the effect of gravity. Nevertheless, in normal operation, that type of actuator is not reversible and suffers from the above-mentioned drawbacks.

OBJECT OF THE INVENTION

An object of the invention is to provide an actuator of the above-mentioned type, but that does not suffer from the drawbacks associated in particular with irreversibility.

BRIEF SUMMARY OF THE INVENTION

In order to achieve this object, the invention provides a telescopic actuator comprising:

- a cylinder having means for coupling it to a first external element;
- a rod mounted to slide telescopically in the cylinder along a sliding axis and including means for coupling it to a second external element;
- a lead screw mounted to rotate in the cylinder about the sliding axis and extending inside the rod to co-operate with a nut secured to the rod, such that rotating the lead screw causes the rod to slide;
- drive means for driving the lead screw in rotation; and
- retention means for axially retaining the lead screw, which means hold a bearing of the lead screw captive in an axial direction.

According to the invention, the retention means are arranged to retain the bearing of the lead screw with axial clearance suitable for absorbing movements imparted to the rod relative to the cylinder.

Thus, when the actuator is used to cause the leg of the undercarriage to be lowered, the bearing of the lead screw is in abutment against the element of the axial retention means that hold it while the drive means are causing the lead screw to rotate. When the undercarriage reaches its deployed position, the undercarriage strut becomes "frozen" and behaves like a rigid element, preventing the undercarriage leg from moving. Under such circumstances, the distance between the attachment points of the actuator is static and the rod is prevented from moving axially relative to the cylinder.

By continuing to rotate the lead screw a little, the lead screw is caused to move axially a little so that its bearing takes up a position substantially in the middle of the space made available thereto by the axial retention means, with the axial clearance then being shared on either side of the bearing. By stopping the drive means when the bearing of the lead screw is in this position, it is ensured that, in the event of the undercarriage or the structure of the aircraft deforming so as to vary the length of the actuator, this length variation can be absorbed within the limit set by the axial clearance as shared in this way in one direction or the other. Thus, the length of the actuator may vary without the actuator opposing any force other than a friction force against axial movement in response to imposed sliding.

The invention applies equally well to an actuator in which the retention means continuously retain the lead screw bearing and to an actuator in which the axial retention means are controllable for releasing the lead screw bearing in selective manner, which is advantageous for allowing the rod to slide freely in the cylinder, e.g. in the event of failure of the motor member for rotating the lead screw.

BRIEF DESCRIPTION OF THE FIGURE

The invention can be better understood in the light of the following description with reference to the sole accompanying FIGURE, which is a longitudinal section of an actuator in a particular embodiment of the invention.

DETAILED DESCRIPTION OF THE FIGURE

The actuator of the invention comprises:

- a cylinder 1 carrying a lug 2 at one of its ends with a ball joint for coupling to an external element, e.g. the structure of the aircraft, the other end of the cylinder being open;
- a rod 3 mounted to slide telescopically in the cylinder along a sliding axis X, and carrying at its end a lug 4 with a ball joint for coupling to a second external element, e.g. an undercarriage leg;

a lead screw 5 extending inside the rod 3 and co-operating therewith via a helical connection by means of a nut 6 that is secured to the rod 3, that forms a bearing for the rod, and that is engaged in an outside thread of the lead screw 5, such that rotation of the lead screw 5 causes the rod 3 to slide;

a fluted shaft 7 that extends inside the lead screw 5 and that co-operates therewith via a prismatic connection via fluting 8 (shown in part in the figure, but extending over the entire length of the fluted shaft 7) co-operating with complementary fluting of the lead screw 5; and a motor 9 adapted to drive a gearwheel 7A secured to the fluted shaft 7 so as to drive it in rotation via a stage 9A of stepdown gearing, rotation of the fluted shaft 7 causing the lead screw 5 to rotate.

The lead screw 5 has an end 10 carrying a bearing 11 that forms the outside cage of a ball bearing 12 and that is held axially in the cylinder 1 by retention means 20. The retention means 20 are of the claw type in this example. It is recalled for reference that retention means of this type comprise a ferrule 21 having prong-shaped claws 22 defined thereon with hook-shaped ends 23 and suitable for bending radially to allow the item that is to be retained to pass through, specifically the bearing 11 of the lead screw 5 in this example.

In the situation shown, the bearing 11 is held captive by the claws 22, the claws being prevented from bending by means of a rotary sleeve 24 that carries a succession of balls 25 on its inside face, the balls being arranged circumferentially to face the ends of the claws and being spaced apart from one another by spaces. When the sleeve 24 is placed in a blocking, first angular position (as shown), in which the balls 25 are directly in register with the ends 23 of the claws 22, the claws 22 are prevented from bending, and the bearing 11 is held captive by the claws 22. When the sleeve 24 is moved into a release, second angular position, in which the spaces between the balls 25 are brought into register with the ends 23 of the claws 22, then the claws can bend radially, and under the effect of traction applied to the rod 3 the bearing can escape from the claws 22, thereby enabling the lead screw to slide under drive from the rod 3. In order to cause the sleeve 24 to pass from the blocking position to the release position, the sleeve in this example is secured to a lever 26 that is operated by an eccentric 27, which is itself actuated by a motor 28. Rotation of the motor 28 causes the eccentric 27 to rotate, and thus causes the lever 26 to pivot, thereby causing the sleeve 24 to turn.

In this example, and according to an essential aspect of the invention, the bearing 11 is held by the claws 22 of the retention means 20 with axial clearance j. The bearing is shown in its medium position, with the clearance j being shared on either side of the bearing 11 as two half-sized clearances j/2. When used to operate an undercarriage, the actuator operates as follows.

In normal operation, the bearing 11 of the lead screw 5 is held axially by the retention means 20, as shown. When moving the leg of the undercarriage between the stowed position and the deployed position, the leg exerts traction on the rod 3 and forces the bearing 11 to come into abutment against the ends 23 of the claws 22. In order to allow the undercarriage to be lowered, it is appropriate to cause the motor 9 to rotate the fluted shaft, thereby causing the lead screw 5 to rotate, and consequently causing the rod 3 to slide in the cylinder 1.

The undercarriage continues to be lowered until it reaches its deployed position. The strut stabilizing the leg is then rigidified, and the leg is prevented from moving in its deployed position. Whereupon, the distance between the lugs 2, 4 of the cylinder 1 and of the rod 3 becomes frozen.

If rotation of the motor 9 is not stopped, and since the rod 3 can no longer move relative to the cylinder 1, it is the lead screw 5 that is caused to reverse. Thus, the bearing 11 will move under the claws 22 so as to become progressively recentered in the space in which it is held captive. When the bearing 11 comes substantially into the center of the space under the claws 22 (as shown here with clearance substantially equally distributed on either side of the bearing), it is appropriate to stop the motor 9.

Arranged in this way, the actuator can be subjected to changes of length (e.g. while the aircraft is moving on the ground causing the leg or the structure of the aircraft to be deformed), such variations in length being absorbed within the limit set by the installed clearance without the actuator opposing any resistance other than a mere friction force.

When the undercarriage leg is raised from its deployed position to its stowed position, it is appropriate to cause the motor 9 to rotate in the opposite direction. Thus, after an initial stage of taking up the clearance during which the bearing 11 returns into abutment against the ends 23 of the claws 22, the rod 3 begins to move axially in order to return into the cylinder 1. When the undercarriage reaches its stowed position, the distance between the lugs 2, 4 is once more frozen. It is then appropriate to stop the motor 9 immediately in order to avoid applying a force to the undercarriage and to the structure of the aircraft, and then to make the motor 9 rotate in the opposite direction until the bearing 11 is in the center of the space under the claws 22.

When arranged in this way, the actuator can be subjected to variations in length (e.g. while the aircraft is maneuvering in flight, giving rise to deformation of the leg or the structure of the aircraft), with these variations in length being absorbed within the limit set by the installed clearance without the actuator opposing any resistance other than a mere friction force.

In the event of an emergency, e.g. in the event of the motor 9 failing while the undercarriage is in the stowed position, it is naturally still possible to release the bearing 11 by turning the sleeve 24, thereby allowing the lead screw 5 to move with the rod 3 under the action of the weight of the undercarriage leg. Such an arrangement makes it possible to guarantee that the undercarriage deploys even if the motor 9 fails or is no longer powered.

The invention is not limited to the above description but on the contrary covers any variant coming within the ambit defined by the claims. In particular, although the controllable retaining member for selectively releasing the bearing of the lead screw is described herein as being of the claw type, it is possible to use other retaining members, e.g. such as a retaining member having fingers or a retractable segment, providing that clearance is arranged in the retention of the lead-screw bearing.

More generally, the invention also applies to actuators in which the means for retaining the lead-screw bearing are not controllable for releasing said bearing. Under such circumstances, the bearing continues to be held captive by the retention means (with the clearance j), and the means for driving the lead screw in rotation may be simplified and need not include the intermediate fluted shaft between the motor member and the lead screw.

What is claimed is:

1. A telescopic actuator comprising:
   a cylinder having means for coupling it to a first external element;
   a rod mounted to slide telescopically in the cylinder along a sliding axis and including means for coupling it to a second external element;

a lead screw mounted to rotate in the cylinder about the sliding axis and extending inside the rod to co-operate with a nut secured to the rod, such that rotating the lead screw causes the rod to slide;

drive means for driving the lead screw in rotation; and retention means for axially retaining the lead screw, which means hold a bearing of the lead screw captive in an axial direction, the retention means being arranged to retain the bearing of the lead screw with axial clearance suitable for absorbing movements imparted to the rod relative to the cylinder;

wherein the drive means for driving the lead screw in rotation are controllable to move the bearing of the lead screw axially until it is centered in the retention means so as to benefit from substantially half of the clearance on either side of the bearing.

2. A telescopic actuator according to claim 1, wherein the retention means are controllable in selective manner to release the bearing of the lead screw in response to a release order.

3. A telescopic actuator comprising:

a cylinder having means for coupling it to a first external element;

a rod mounted to slide telescopically in the cylinder along a sliding axis and including means for coupling it to a second external element;

a lead screw mounted to rotate in the cylinder about the sliding axis and extending inside the rod to co-operate with a nut secured to the rod, such that rotating the lead screw causes the rod to slide;

drive means for driving the lead screw in rotation; and retention means for axially retaining the lead screw, which means hold a bearing of the lead screw captive in an axial direction, the retention means being arranged to retain the bearing of the lead screw with axial clearance suitable for absorbing movements imparted to the rod relative to the cylinder;

wherein the drive means for driving the lead screw in rotation are controllable to move the bearing of the lead screw axially until it is centered in the retention means so as to benefit from substantially half of the clearance on either side of the bearing, wherein the drive means for driving the lead screw in rotation comprise:

a fluted shaft mounted to rotate in the cylinder about the sliding axis and extending inside the screw to drive it in rotation via a fluting connection; and a motor member for driving the fluted shaft in rotation.

\* \* \* \* \*